Nov. 1, 1966  J. BORDEAUX ET AL  3,282,108
TEMPERATURE SENSOR
Filed Sept. 24, 1963
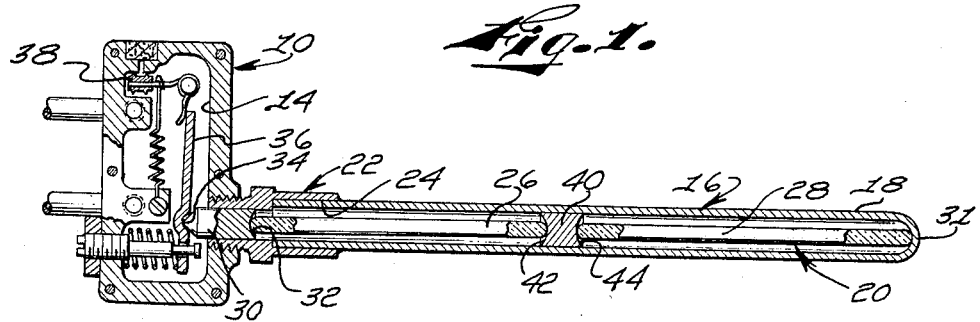
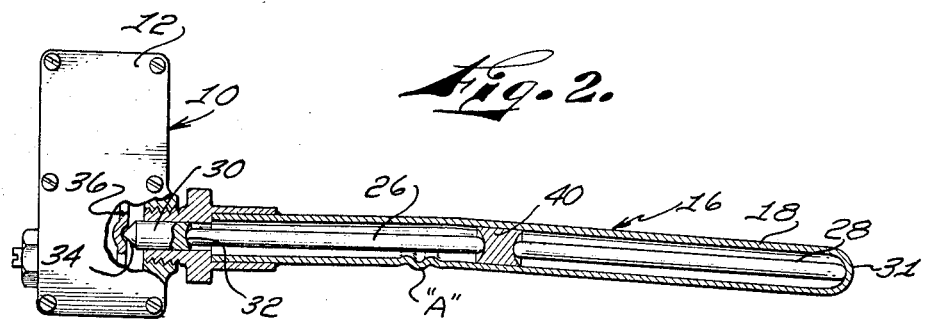
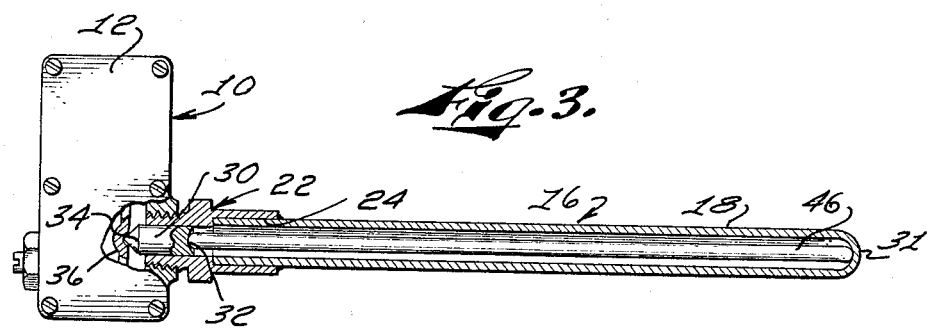
INVENTORS
JEAN BORDEAUX
DOUGLAS R. SCOTT
BY
Thomas L. Kabani
ATTORNEY

United States Patent Office 3,282,108
Patented Nov. 1, 1966

3,282,108
TEMPERATURE SENSOR
Jean Bordeaux and Douglas R. Scott, Santa Ana, Calif., assignors to Robertshaw Controls Company, Richmond, Va., a corporation of Delaware
Filed Sept. 24, 1963, Ser. No. 311,009
1 Claim. (Cl. 73—362.3)

The present invention relates broadly to a temperature sensor and more particularly to a sensor capable of withstanding shock and rough handling.

It is customary in the thermostatic industry to provide a temperature sensor including a lineal expanding element coupled with a relatively non-expanding element. One of these elements is coupled to a body casing to operate a control element of some sort.

The rod is ordinarily the member having the lower coefficient of thermal expansion and in order to obtain the maximum differential expansion, the rod is made of a material such as glass, ceramic, or quartz which has a very low coefficient of thermal expansion. However, actuators of this construction are not well suited to many applications where they are subjected to shock or extreme vibration. Under these conditions, the nonmetallic rods are broken and as a result, the actuator fails to operate properly sometimes becoming completely inoperative.

Temperature sensors of the type described are used under very severe operating conditions and many installations and one in particular being, a smog control catalytic muffler. The present invention finds excellent application in this type of installation where the temperature sensing element is subjected to vibration, shock, and bending forces. As it is apparent, this device should operate reliably under the extreme conditions and that its construction is such to continue accurate operation over a long period of time.

Under adverse conditions, forces may be applied to the tube and rod and often sufficiently great that they become bent. In conventional design, the rod then binds inside the tube because of the comparatively small clearance between the two members and when the degree of bending of the curvature is great enough, the rod breaks. Thus even though the rod may not break completely, the operating conditions may be sufficiently severe to cause the accuracy of the device of conventional design to be impaired and the device then being of no practical value.

In some installations, such as anti-smog devices for vehicles, it is quite often typical that the average operating temperature is in the range of 1600°–2200° F. The temperature sensed by the present invention must be quite accurate, since extended operation at temperatures of 2200° F., can have deleterious effect upon the anti-smog muffler and render it inactive within a very short time. The sensor then shunts the exhaust gases through the catalytic muffler only in such conditions when the temperature within the muffler is below a critical temperature. Under conditions of malfunction of the temperature sensor, the muffler can become burned and its function destroyed without any apparent knowledge of the operator of the vehicle.

With these problems in mind, it is the primary object of the present invention to provide a temperature sensor capable of withstanding extreme temperatures up to and exceeding 2000° F., withstanding bending forces, warpage, and shock, and still being able to perform properly.

It is another object of the present invention to provide a temperature sensor which has a simplified construction adapted for use in high temperatures, and which may be operated properly and accurately after being subjected to forces which distort the alignment of the elements.

A further object of this present invention is to provide a thermostatic control which will allow a two element sensor to be moved out of alignment by forces applied to the exterior and still operate properly without substantial loss of calibration.

With these objects in mind, it is a feature of the present invention to provide a temperature sensor which has one or more low expansion elements which may pivot with relation to a high expansion element.

It is a further feature of the present invention to provide a low expansion element which has a size which is substantially smaller than its coacting high expansion element thus simplifying the construction.

With these objects in mind, our invention has been achieved by using a temperature sensor having two operating members, one surrounding the other and with different coefficients of expansion. The inner element is of substantially smaller size in cross-section than the outer element, allowing the outer element to be distorted without applying pressure on the inner element. The ends of the inner element are rounded thereby allowing this element to pivot in relation to the other element. Pivoting devices are positioned on opposite ends of the inner element and a spacer is placed in abutting relation with the inner element to transfer the linear motion from this element to an actuator which is turned on and off in a desired manner.

Other objects and features of the present invention will be understood by reference to the following description and annexed drawings in which:

FIGURE 1 is a longitudinal median section of the present invention associated with control elements;

FIGURE 2 is a longitudinal median section of the present invention illustrating the effect of deformation on the present invention; and FIGURE 3 is a longitudinal median section of another embodiment of the present invention.

As shown in FIGURES 1–3, the thermostatic control of the present invention is constructed with a hollow housing as generally indicated by the numeral 10. The housing 10 is formed with a generally rectangular hollow shape closed by a cover 12 which cooperates therewith to form an interior chamber 14. The particular shape of the housing 10 is not important and the particular type of operating device carried by the casing may be varied from the particular variety illustrated in the present embodiment. In the application bearing Serial Number 241,811, filed December 3, 1962, the particular thermostatic control illustrated in FIGURE 1 is discussed in detail, however, the present invention is not limited to a particular control element, but rather to the temperature sensor.

The temperature sensor, as a whole indicated at 16, comprises two coaxial operating members namely, the temperature sensing tube 18 and the core 20. The tube 18 is a cylindrical metal cylinder closed at one end and may be fabricated from any metal having a sufficiently large coefficient of thermal expansion. In the preferred embodiment, the tube is fabricated from stainless steel or nickel-chrome alloys which may withstand repeated exposures to temperatures in excess of 2000° F. The choice of the material would depend upon the temperature, atmosphere, and application for the temperature sensor. Adapter 22 is threaded within the housing 10 and has a passageway 24 therethrough which receives the tube 18 fixedly attached thereto.

In FIGURE 1, the core 20 comprises a plurality of cylindrical rods 26, 28 which are fabricated from an extremely low coefficient of thermal expansion which in the preferred embodiment is quartz, glass, or a ceramic material, such that the temperature sensor may be exposed to an atmosphere of 2000° F., or more.

While the particular dimensions of the tube 18 and rod 26, 28 are not a part of the invention, it may be well to consider the particular sizes used in actual embodiments to illustrate the size relation between the rod and tube. Rods 26, 28 may have cylindrical cross-sections of 1/8 inch diameter while the tube 18 is 1/4 inch diameter with a .020 inch wall thickness, thereby leaving a gap between the rod and the tube of approximately 3/64 of an inch.

The rods 26, 28 have the ends rounded in any convenient manner for the particular type of material used. However, it has been found that fire polishing the ends of rods fabricated from quartz has been the easiest and cheapest manner of producing rounded ends on a high production basis. The rod's rounded end may also be ground or cast in this particular shape if quartz is used for the material fabricated for the rod. The particular end shape of the rod may be extended into variations of conical shapes or polygonal shapes to allow the rod to pivot within the tube 18 in the event the tube 18 is bent or distorted with relation to the rods 26, 28. The particular shape of the rod end is important since the rounded shape distributes the load transmitted by the rod to adjacent components over an extended area rather than point contact. This tends to prevent chipping of the rod end which disturbs the calibration of the control.

Rod 28 abuts the closed end 31 of the tube 18 and while the present embodiment uses a hemispherical shape for the closed end 31, the particular shape may be varied into a polygonal, conical shape, or the like to distribute the load of the rod 28 thereon. The particular size of the closed tube end is necessarily of a larger size than the rounded end of the rod such that the rod may pivot with relation to the tube 18. While not illustrated, a plug may be inserted within the end of the tube having a shape thereon which would allow the rod to pivot thereon. Other modes of construction of a closed tube end are considered within the scope of the present invention.

An insert 30 of a generally cylindrical shape abuts the extremity of the rod 26 and projects into the adapter 22. The insert 30 mates very closely with the interior of the adapter 22 but still has enough clearance around its periphery to allow lateral movement as the relative length of the rods 26, 28 and tube 18 change with temperature variations. One end of the insert 30 has a depression 32 therein of such a shape to allow the rounded end of the rod 26 to pivot thereon. For convenience in fabrication, this depression may have a generally conical shape of possibly 120°—such as may be formed with the point of a drill. Other shapes are acceptable and may be of a spherical, polygonal, or similar shaped depression would allow the rod to distribute its load therein and allow the rod 26 to pivot with relation to tube 18. The nose 34 of the insert 30 is sharpened and projects from the tube into the casing 10 abutting the lever 36. Thus as the relative length of the rods 26, 28 and the tube 18 changes with temperature variations, this change in length is transmitted through the lever 36 to an operating element which in this case is a valve 38. Between the plurality of rods 26, 28 is interposed a slidable spacer 40 which allows the rods 26, 28 to pivot with relation to each other and with relation to tube 18. Conically shaped depressions 42, 44 are formed in the spacer 40 to provide a support for at least three points on the rounded ends of the rods 26, 28. The shape of the depressions 42, 44 may be varied with the only limitation that the shape would allow a pivoting movement of the rods 26, 28. While the present embodiment illustrated in FIGURE 1 uses one spacer and two rods, the present invention includes the use of a plurality of rods and spacers. The operation of rod and tube temperature sensors are very well known in the art and extended explanation of its operation is deemed unnecessary.

Another embodiment of the present invention is illustrated in FIGURE 3, wherein the casing 10, adapter 22, and tube 18 are substantially identical to that illustrated in FIGURE 1. The temperature sensor core comprises a single rod 46 being similar in configuration to the rod elements 26, 28, illustrated in FIGURE 1. Rod 46 has rounded ends abutting the insert 30 and the tube closed end 31. Rod 46 has a cross-section dimension similar to rods 26, 28, and is substantially smaller than the size of tube 18, thereby allowing the tube to be bent in a limited manner without fracturing the rod 46.

FIGURE 2 illustrates the pivotal arrangement of the rods 26, 28 with relation to the tube 18 and graphically illustrates one of the features of the present invention. The tube 18 may be bent or distorted at "A" with relation to the rods 26, 28 such that the tube 18 no longer has a straight axis. Either the single rod 46 of FIGURE 3, or a plurality of rods 26, 28, FIGURES 1 and 2 may be pivoted upon the closed end 31 of the tube 18 and the insert 30. In FIGURES 1 and 2, rods 26, 28 may also pivot with relation to spacer 40. In testing a tube having a diameter of 1/4 inch and a length of approximately 4½ inches, it was found that the closed end of the tube could be bent ½ inch without breaking the rod and having the temperature sensor perform satisfactorily. This empirical data illustrates the advantages of the present invention and while the distorted shape of the tube would change the relative length of the tube with relation to the rod, this variation while causing a slight error, would be more acceptable than a non-functioning temperature sensor, had the rod broken within the tube after the tube has been bent.

From the foregoing description, it will be apparent that various changes in the construction and arrangement of the components of my invention may be made by persons skilled in the art without departing from the spirit and scope of this invention. A particular configuration of the cross-section of the rod and tube element necessarily does not have to take the form illustrated in the preferred embodiments but may be varied according to the application of the temperature sensor to the particular control. The particular sizes which have been set forth above for illustration purposes do not limit the present invention since these embodiments are merely illustrative in the particular shape and size may be varied greatly with the type of control required. Accordingly it is to be understood that the foregoing description is considered to be illustrative of rather than a limitation upon the present invention defined by the appended claim.

We claim:

A temperature sensor for use in a chamber attaining temperatures in the order of 1800° F. to 2200° F., and which sensor can operate properly after being subjected to bending forces, comprising, a temperature sensing tube having a relatively high coefficient of expansion, said tube having an open end and having a closed end adapted to be inserted into the chamber, the tube having relatively thin walls as compared to its diameter, solid cylindrical core means having a relatively low coefficient of expansion positioned within said tube in coaxial relationship therewith, said core means including at least two longitudinally aligned rods, and a spacer interposed between adjacent ends of said rods and slidably mounted within said tube, the adjacent ends of said rods being rounded, the spacer having surfaces conforming to and abutting the adjacent ends of said rods whereby said rods are prevented from having slidable contact with the interior surface of said tube, the diameter of said rods being substantially smaller than the inside diameter of said tube, the closed end of said tube having a surface conforming to the shape of the end of said rods, one end of one of said rods abutting the closed end of said tube, an insert slidably mounted within said tube and having one end extending outwardly from the open end of said tube and being adapted to actuate a control element, and the opposite end of said insert having a surface conforming to and abutting the opposite end of one of said rods whereby said rods are allowed to pivot relative to said tube to prevent breaking of the core means upon distortion of the tube.

(References on following page)

References Cited by the Examiner

UNITED STATES PATENTS

| | | | |
|---|---|---|---|
| 1,672,229 | 6/1928 | Pairman | 73—362.1 |
| 1,728,626 | 9/1929 | Pairman | 73—362 |
| 1,970,942 | 8/1934 | Payne | 73—362.3 X |
| 2,481,265 | 9/1949 | Van Denberg et al. | 73—263.3 X |
| 3,004,123 | 10/1961 | Cannon | 200—137.2 |
| 3,025,374 | 3/1962 | Reingruger | 200—137.2 |
| 3,045,085 | 7/1962 | Reingruger | 73—362.3 X |

LOUIS R. PRINCE, *Primary Examiner.*

D. M. YASICH, *Assistant Examiner.*